United States Patent

[11] 3,607,581

| [72] | Inventor | Gary A. Adams<br>Beaverton, Mich. |
|------|----------|-----------------------------------|
| [21] | Appl. No. | 830,668 |
| [22] | Filed | June 5, 1969 |
| [45] | Patented | Sept. 21, 1971 |
| [73] | Assignee | Koehring Company<br>Milwaukee, Wis. |

[54] SPIN-WELDING HOLDER AND LOADING APPARATUS
18 Claims, 7 Drawing Figs.

[52] U.S. Cl. .................................................... 156/580,
156/73, 28/470.1
[51] Int. Cl. .................................................... B30b 3/04,
B29c 27/08
[50] Field of Search .......................................... 156/580,
73; 28/470.1

[56] References Cited
UNITED STATES PATENTS

| 3,297,504 | 1/1967 | Brown et al. | 156/580 X |
| 3,316,135 | 4/1967 | Brown et al. | 156/580 X |
| 3,499,068 | 3/1970 | Brown | 156/73 X |

*Primary Examiner*—Benjamin A. Borchelt
*Assistant Examiner*—Jerald J. Devitt
*Attorney*—Learman & McCulloch

ABSTRACT: Friction-welding apparatus for joining thermoplastic container top and bottom parts which move continuously. The bottom parts are guided along a vacuum support plate and switched from one orbital path to another so as to be concentrically aligned with orbiting lower mandrels. The top parts are moved gradually up into the loops of holder bands which are tightened to positively grip them during the friction-welding operation.

PATENTED SEP 21 1971

INVENTOR.
GARY A. ADAMS

BY

*Learman & McCulloch*

INVENTOR.
GARY A. ADAMS
BY
Learman & McCulloch

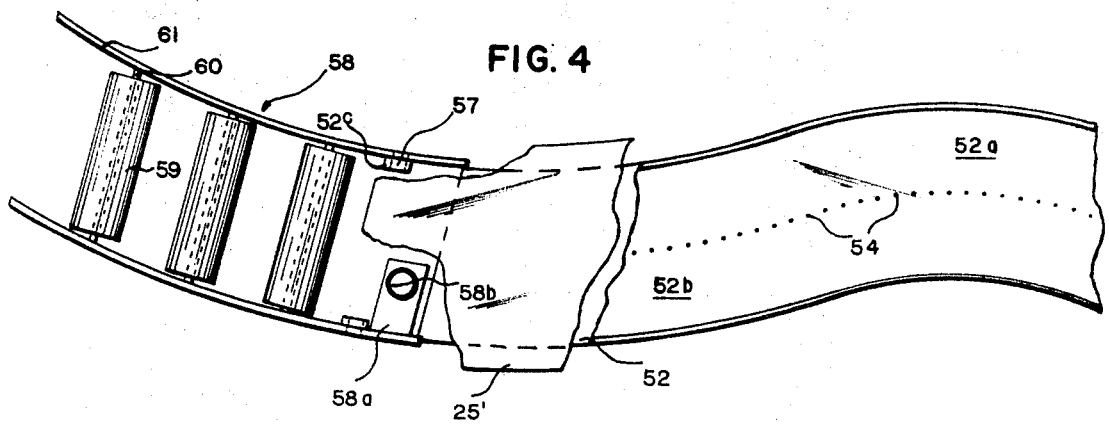
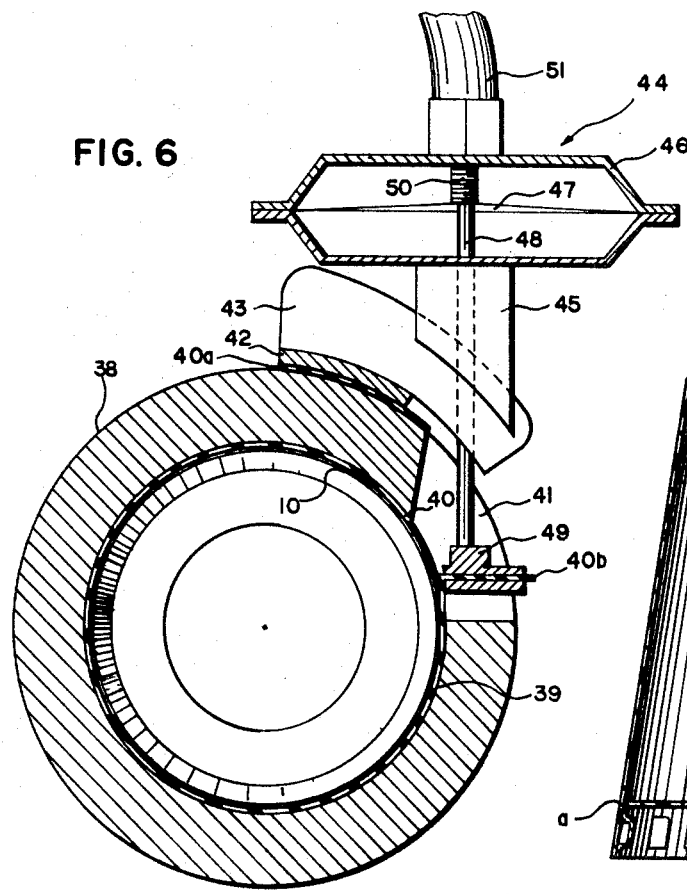
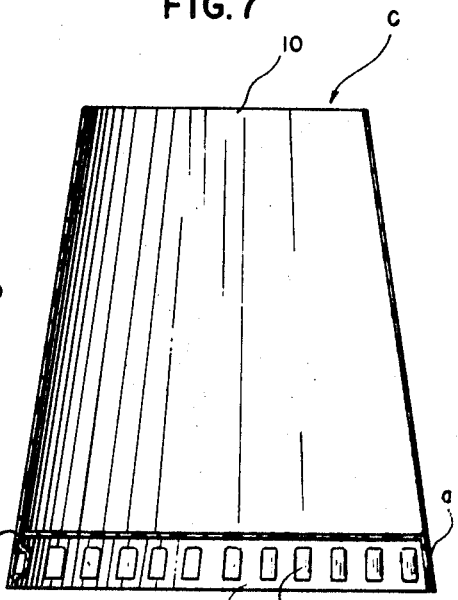

SPIN-WELDING HOLDER AND LOADING APPARATUS

This invention relates to friction-welding apparatus for joining parts of thermoplastic, synthetic plastic containers and more particularly to container part aligning and holding mechanism. In prior art machines of the character illustrated in the present assignees U.S. Pat. No. 3,297,504, friction-welding apparatus for uniting the top and bottom parts of cleanser containers is illustrated. The present invention is concerned with a machine for friction-welding bottom walls to container bodies for holding food products such as yogurt. Other machinery is employed later on in the process line to secure tops or caps to the container bodies so formed after they have been filled with the product.

Because of the different configuration of the parts involved and allied factors, problems have been encountered which were not previously appreciated nor solved. Specifically, because the thin-walled bottoms of the containers to be processed are so shaped that they must fit over a mandrel, rather than be received within a tubular holder, difficulty has been experienced in a machine of this type, wherein both the parts and friction welding holders move continuously, in centering the bottoms so that they are precisely concentric with the mandrels upon which they are to be received upon delivery by star-wheel mechanism.

It has further become necessary to provide positive-holding top part retainers for the tubular or shell-like container bodies which instantly first grip the container bodies and then release them further on in the cycle once the bottoms have been welded to the container bodies.

A further object of the invention is to provide, in conjunction with each positive-holding, container body receiver, mechanism which will aid moving the container body up into the receiver and hold it there so that the gripping mechanism can be activated. Other objects and advantages of the invention will become apparent upon reference to the accompanying drawings, and to the attached specification. In the drawingS:

FIG. 4 is a top plan view of the vacuum member for supporting the bottom parts as they move to the mandrels and the top part support member which is mounted for limited vertical pivoting movement;

FIG. 6 is a similar view but with the band shown in container-holding position;

FIG. 7 is a sectional elevational view illustrating a container which has had its top and bottom parts joined by friction-welding.

Figure 1:
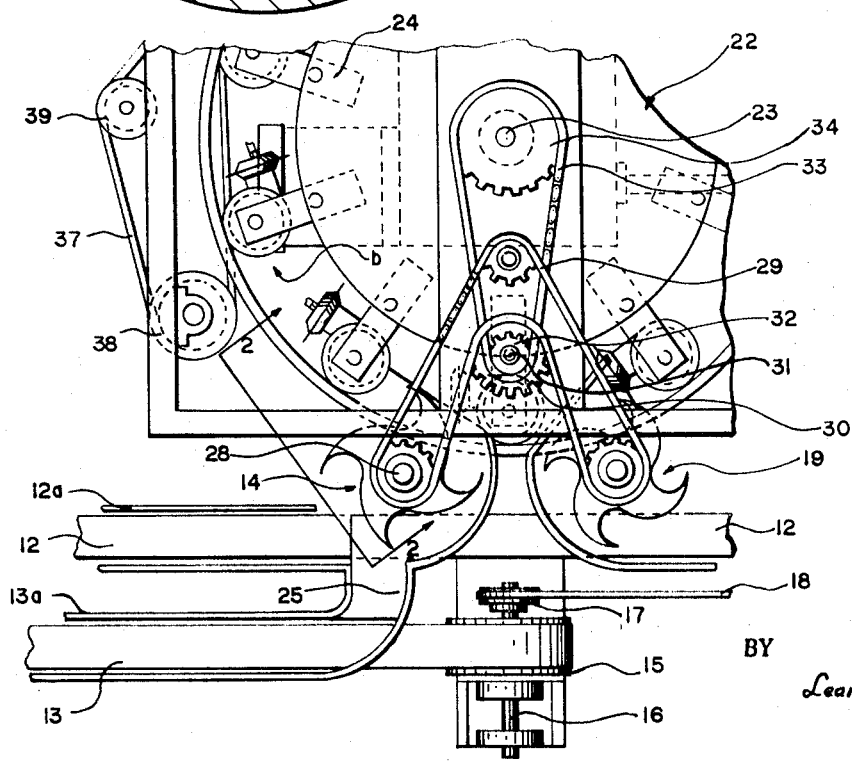
FIG. 1 is a fragmentary top plan view showing the manner which container parts are delivered to the friction-welding machine.

Referring now particularly to the accompanying drawings and in the first instance to FIG. 1, it will be seen that the view is similar to FIG. 7 of the previously mentioned U.S. Pat. No. 3,297,504, which is incorporated herein by reference and shows a machine of the same general character for assembling and joining thermoplastic container sections by friction-welding. The present machine, however, must handle container parts of different configuration which the former machine was not capable of processing and, as will become apparent, certain additional mechanisms have been employed to permit the machine to handle the containers which will be described.

The yogurt container C, which is to be formed, is particularly illustrated in FIG. 7 and includes a tubular frustoconical container body or top part 10 and an inversely cup-shaped bottom part 11 which is of a configuration to be received within the lower end of the top part 10 as shown. The present machine is designed to operate in a continuous manner to join continuously supplied and moving bottom parts 11 to continuously supplied and moving top parts 10 along a friction welded peripheral surface area "a." As indicated earlier, other machinery located downstream from the present machine will later friction-weld or otherwise secure a container top to the body part 10 to close the open top thereof once the containers C have been filled with product.

As in the patent mentioned, conveyors 12 and 13 are provided for delivering bottom parts 11 and top parts 10, respectively, to delivery star-wheel mechanism generally designated 14. The conveyors 12 and 13 may comprise endless belt conveyors which include side guide rails 12a and 13a respectively, and it is to be understood that the belt conveyor 13 is elevated with respect to the belt conveyor 12 and is passed around a front pulley member 15 on a shaft 16 which may be continuously driven via a pulley 17 and drive belt 18. The belt conveyor 12 extends beyond the front end of the conveyor 13 and serves as an exit conveyor for receiving the joined container parts 10 and 11 from an exit star-wheel assembly generally designated 19.

Also, as in the patent mentioned, the container parts 10 and 11 are delivered to upper and lower part holding assemblies generally designated 20 and 21, mounted in the same manner in vertically aligned concentric relationship on a continuously moving rotary carrier structure generally designated 22. The carrier structure 22 is mounted for rotation on a central drive shaft 23 to move clockwisely in FIG. 1 in the direction "b," shaft 23 being driven continuously by a motor (not shown) as before. Upper and lower radially extending support arms 24 and 24a, respectively, extend from the carrier structure 22 as previously to support the upper and lower holder assemblies 20 and 21. Upper and lower support shelf or table members 25 and 25a lead from the conveyors 13 and 12 to the star wheel as shown in FIG. 1 and 2, the lower bottom part supporting shelf terminating short of shelf 25 at a terminal edge portion 25'.

Figure 2:
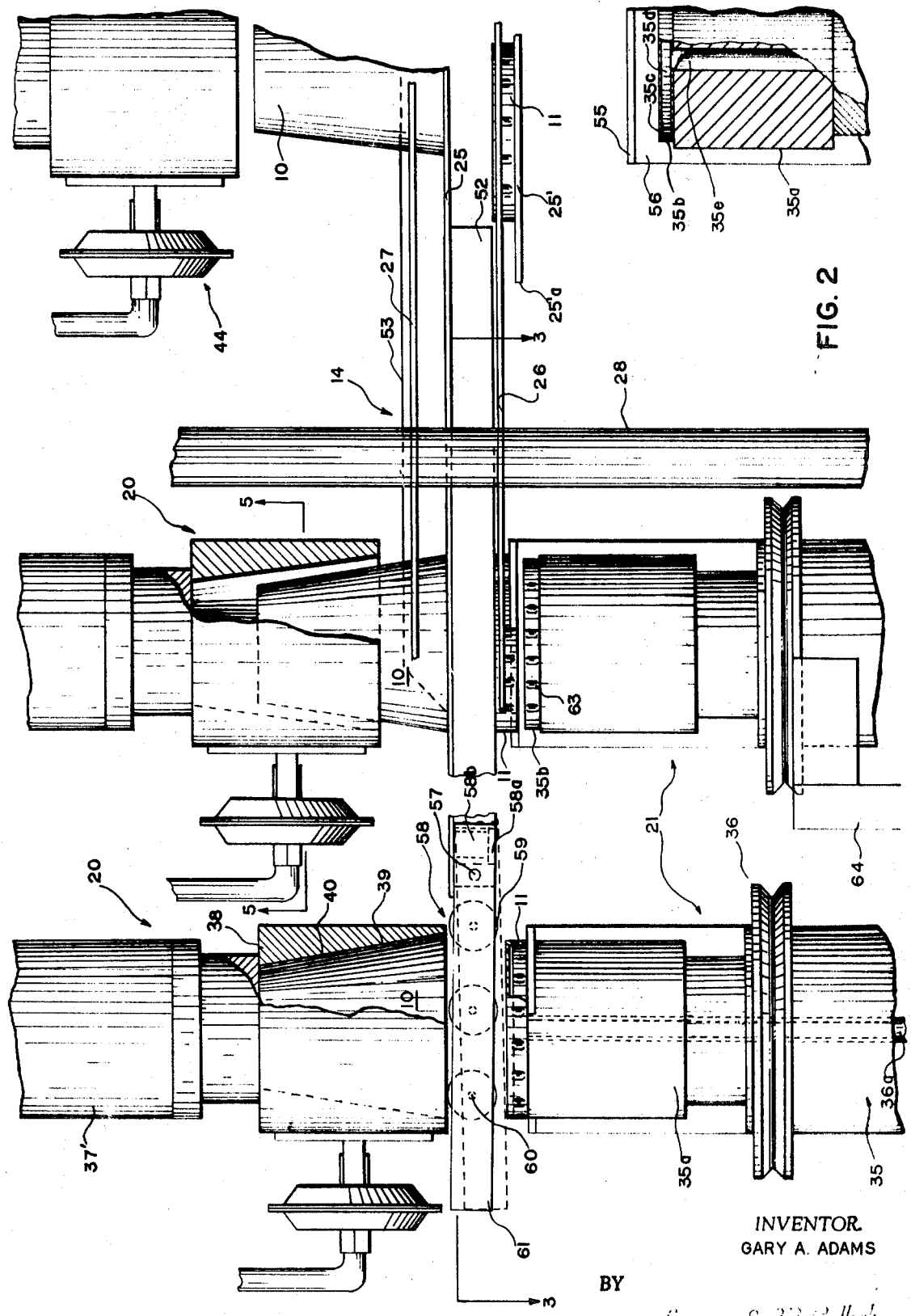
FIG. 2 is a greatly enlarged, fragmentary, side elevational view, partly in section and taken on the line 2—2 of FIG. 1, to show the manner in which the top or container body parts are received within the upper holders and the bottom parts are received on aligned lower mandrels.

As FIG. 2 particularly indicates, the delivery star-wheel mechanism 14 comprises a lower part-delivering star wheel 26, and an identical upper part-delivering star wheel 27, each mounted for rotation with a shaft 28 which may be driven, as before, by a chain 29 trained around a sprocket 30 on a stub shaft 31. It will be seen that the shaft 31 is driven by a sprocket 32 via a chain 33 trained around a sprocket 34 on the central drive shaft 23. In this way the star wheels 26 and 27 are driven in unison in timed relationship with the carrier structure 22.

As FIG. 2 also particularly indicates, the lower part holder comprises a rotatable spindle (see FIG. 2) mounting a pulley member 36 adapted to be engaged by a driven belt 37, as in the patent mentioned, once the container parts 10 and 11 have been loaded to the vertically movable upper and lower holder assemblies 20 and 21, respectively, and brought vertically into engaged relationship. The belt 37 is trained around a pulley system including an end pulley 38, and idler pulley 39, and an opposite end driven pulley (not shown). Each rotatable mandrel 35 includes also an upper cylindrical part 35a with a slightly reduced diameter terminal end portion 35b forming a mandrel on which a bottom part 11 is to be received. The bottom mandrel 35b is of a diameter to closely receive the bottom part 11 and openings 35c in its upper surface connect with a vacuum passage 35d communicating with a vacuum source. The passage 35d may be conveniently provided by the hollow axle member 36a which may be mounted on each member 24a, and on which the holder spindle 35 is mounted for rotation by suitable ball bearing assemblies (not shown).

Each upper holder assembly 20, while vertically movable, is prevented from rotating about its axis and includes a support 37' mounted by one of the upper support arms 24 and having a lower end on which is fixed a tubular holder member 38 with a tapered bore 39 as shown particularly in FIG. 2. The bore 39 is configured to the shape of, but is somewhat greater in size than a container top 10, and mounted within each bore 39, is a band 40 which, as will presently become apparent, forms a noose or loop which may be selectively tightened or closed around a container body 10 which is moved up into position within the bore 39. The one end of each loop 40 (see FIGS. 5 and 6) has an end portion 40a extending out through an opening 41 provided in the sidewall of each holder 38 which is fixed in position on the holder 38 by bolts or the like which secure a support member 42 in position. The support member 42 carries a support arm 43 on which a diaphragm assembly generally designated 44 is fixed via upper and lower support plates 45.

Figure 5:
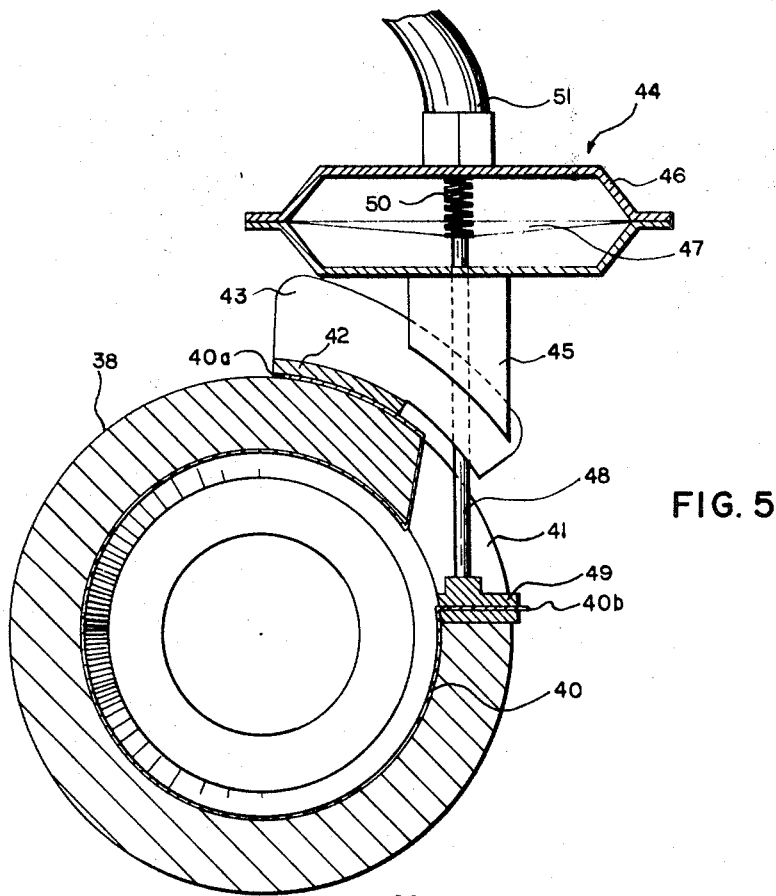
FIG. 5 is a considerably enlarged, sectional inverse plan view taken on the line 5—5 of FIG. 2, but rotated through 90° for the sake of convenience, the view showing the container-holding band in released position.

As FIGS. 5 and 6 indicate, the diaphragm assembly 44 on each holder assembly 20 includes a housing 46 anchoring a fabric diaphragm 47 at its peripheral edge and the diaphragm 47 is connected centrally as usual to an actuator rod 48 which extends between the plates 45 to connect to the free end 40b of band 40, a fitting 49 being provided on the end of rod 48 to receive the band end 40b as shown. The extreme positions of the diaphragm and band 40 are illustrated in FIGS. 5 and 6, wherein the loop of band 40 is shown in relaxed and container holding closed positions, respectively. A coil spring 50 normally urges the diaphragm 47 to maintain the diaphragm rod in the outward position as shown in FIG. 5 so that normally the loop 40 is in radially expanded relaxed position Provided to selectively operate the diaphragm assembly 44 is a vacuum hose 51 which selectively communicates a vacuum source, such as a conventional vacuum pump, with the interior of diaphragm assembly 44 and is capable of exerting sufficient suction forces to overcome the bias of spring 50 and cause the diaphragm rod 48 to be withdrawn to the position in which it is shown in FIG. 6 wherein the band 40 is tightly closed around a container body part 10.

In FIG. 2 at the right hand end of the view a container top 10 is shown as supported on the upper stationary table part 25 and a container bottom 11 is supported on the lower stationary table part 25' and it should be apparent that the star-wheel parts 26 and 27 are engaged in moving the parts 10 and 11 along the tables 25 and 25' in an orbital path into a position of conjuncture with the arc of travel of the pairs of holding assemblies 20 and 21. It will be seen that the upper table 25 extends substantially beyond the lower table 25' and mounted in stationary position is a tubular vacuum duct 52 which is utilized to support the bottom parts 11. The top parts 10 move along the extended table 25 and are properly guided by a guide rail 53 to a position in which they are received by the upper holders 38.

Figure 3:
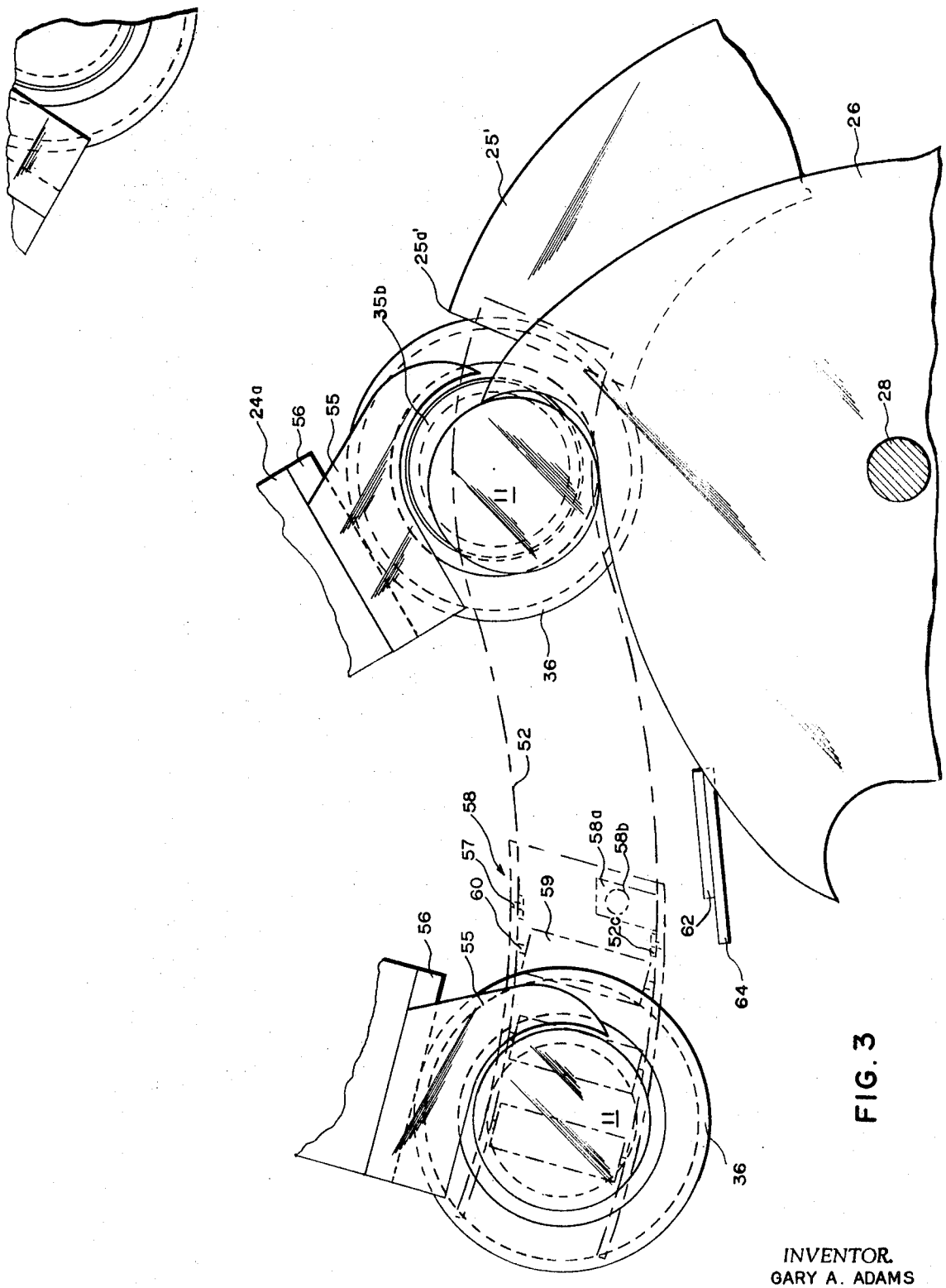
FIG. 3 is a similarly enlarged, fragmentary sectional plan view on the line 3—3 of FIG. 2 and illustrating the manner in which the container bottoms are delivered in aligned position to the bottom part-receiving mandrels.

In FIG. 3 the duct 52 is shown in chain lines only so as not to obscure the other parts. FIG. 4, however, well illustrates the duct 52 which is essentially S-shaped in configuration and includes a front portion 52a curved to the orbiting radius of the star-wheel member 26 and a rear portion 52b curved to the orbiting radius of the holder assemblies 20 and 21. The vacuum ports 54 which are provided in the lower face of the vacuum duct 52 follow the same configuration, and the suction exerted supports the tops 11 as they are moved from the table 25' over to a mandrel top 35b.

The controlled movement of the bottoms 11, by which they are brought into virtually perfect vertical concentricity with a continuously moving mandrel top 35b, is accomplished by the correlation or cooperation of the star wheel 26 and a curvilinear finger member 55 which may be supported on each of the lower carrier support arms 24a by a vertical support plate 56. As FIG. 3 indicates the star wheel 26 moves a particular bottom 11 into a position to be engaged by a positioning finger 55 which then is responsible for changing its arc of travel from the radius of star wheel 26 to the radius of travel of the lower mandrel part 35b and delivering it to the lower mandrel 35b at the terminal end of the fixed vacuum duct or box 52. It should be understood that the lower mandrel or holder assembly 21 moves from the lowered position in which it is shown at the right in FIG. 2 to the raised position in which it is shown at the left in the same FIG. While mechanism for accomplishing this vertical movement and returning the holder assembly 21 vertically are not shown, it is to be understood that it may comprise the same cam mechanism shown in the patent mentioned, with holder 35 being mounted for vertical as well as rotary travel on axle 36a.

Pivotally mounted on the end of the duct 52, as at 57, is a roller assembly 58 comprising essentially an extension of table 25. Each roller assembly 58 which is normally biased to the solid line position shown in FIG. 2 in a manner which presently will be described, includes freely rotatable rollers 59 mounted on axles 60 which extend between side rail members 61. The roller structure 58 is provided to assist the container parts 10 to move upwardly in the holder rings 38 and to hold them in fully raised position until the diaphragm assembly 44 is actuated to tighten the band 40 around them. It will be observed that the roller frame assembly 58 extends outwardly from the vacuum duct 52 at a slightly upwardly inclined angle so that it provides an elevating movement for the parts 10. In FIG. 3 the vacuum duct 52 and roller assembly 58 are shown in diagrammatic lines so as not to obscure some of the other parts. Once a part 10 has been raised to uppermost position the assembly 58 may be pivoted downwardly to the position illustrated by the broken lines at the left in FIG. 2 by the continued orbital travel of a holder 38 on carrier 22. FIGS. 2 and 4 illustrate the manner of biasing roller assembly 58. Ears 52c extend downwardly from the table 25 to receive pins 57. A lateral tab 58a mounted on the roller assembly 58 supports a coil spring 58b which bears against the shelf 25 and normally maintains roller assembly 58 in the "up" position.

Clearly, the required vertical or axial movement of the upper holder members 20 may be accomplished in the same manner as in the patent mentioned with the cam structure disclosed therein. Just as the bottom part 11 is released from the vacuum duct 52 to the mandrel part 35b and descends vertically thereto, the pulley 36 brushes against a nylon, or other suitable long wearing pad 62 (see FIG. 3) which extends slightly into the orbital path of the pulley 36 and causes it to spin sufficiently to vertically orient the vertical ribs 11a in the bottom part 11 with the corresponding slots 63 in the mandrel part 35b. The pad 62 is mounted on a stationary support 64.

In operation, parts 10 proceed inwardly, one behind the other, on conveyor 13 and are forced by the parts behind across to the upper star-wheel disc 27 which moves them along the shelf or table 25. At the same time the continuously rotating carrier structure 22 orbits each upper holder assembly 20 to a location of conjunction with the orbital path in which the star wheel 27 moves the parts 10 and at the proper time, a holder ring 38 on an upper part holder assembly 20 commences to move axially downwardly over a part 10 on shelf 25 as shown clearly in FIG. 2. In FIG. 2 the downward movement of the holder member assemblies 20 is well illustrated by the progressive (in a right to left direction) downward positions of the assemblies 20 which are illustrated. When a part 10 reaches the roller assembly 58, it is assisted upwardly a final increment into a holder member 38 by the roller assembly 58 to the position shown at the left in FIG. 2. As each holder 38 continues to move orbitally, it is, of course, in engagement with the rollers 59 which are free to spin, and it forces the roller assembly 58 downwardly to the lowered position shown in broken lines at the left in FIG. 2 which insures that the container 10 is positioned correctly vertically before the holder band 40 is constricted.

At about the time a part 10 reaches the uppermost position in which it is shown in the leftmost holder assembly 20 in FIG. 2, the diaphragm assemble 20 for that holder assembly 44 is communicated with a vacuum source via line 55 and the diaphragm 47 therein is sucked toward the vacuum line 51 so that rod 48 is retracted and the holders part holding band 40 is tightened around the part 10. It should be noted that the loop of the band 40 is tightened by moving it such that any tendency to rotate part 10 in the holder 38 only serves to tend to tighten the grip of the band 40. In other words, the rotation of the lower part gripping assembly 21 is such relative to the direction of pull of rod 48 that any tendency of part 10 to rotate relative to band 40 will only tend to move band 40 further outwardly in FIG. 6 in a direction to tend to force rod 48 further in a retract direction. Thus, in FIG. 6, the rotation of the bottom part 11 is such that it will tend to rotate part 10 in a counterclockwise direction during the friction-welding operation which only serves to tighten the band 40 on the part 10 and more positively restrain any rotation of part 10 whatsoever.

At the same time that a part 10 is being fed to each upper holder assembly 20, a part 11 is being loaded to the axially aligned lower part holder assemblies 21. The parts 11 are moved one behind the other along lower delivery conveyor 12 to the lower star-wheel member 26 which orbits them individually around an arcuate support shelf 25'. In FIG. 2, a part 11 is shown at the right-hand end of the view, being moved by the star-wheel member 26 along the shelf 25'. Just as the part 11 commences to leave the terminal end 25a' of the lower shelf 25', it engages the vacuum duct 52 and suction forces exerted through the vacuum ports 54 in the leading portion 52a of duct 52 hold the bottom part 11 in engagement with the lower surface of vacuum duct 52 as the part 11 is moved orbitally by the star-wheel member 26.

As FIG. 3 indicates, just after the part 11 has been moved beyond the shelf 25' to the vacuum duct 52, it is engaged by the concentrically disposed finger 55 which is provided for each lower holder assembly 21 and is forced to travel in the orbital path of a lower mandrel 35b thereafter. The finger 55 achieves a final centering or alignment of the part 11 with mandrel top 35b. During the time the part 11 is moving along the vacuum duct 52, the lower holder 35 is being raised, as shown by the progressive (in a right to left direction) positions of the various holders 35 in FIG. 2, and at about the time a mandrel portion 35b is about to enter a part 11, the pulley 36 on the particular holder 35 is engaged by the stationary nylon pad 62 in its path and rotated a sufficient increment so that the ribs 63 on the mandrel part 35b engage within the grooves 11a provided in the sidewall of the bottom part 11. The interlocking of the ribs 63 with the grooves 11a, prevents relative rotation of the part 11 with the mandrel part 35b over which it fits. Also at about the time that the mandrel part 35b is moving up into the bottom part 11, suction forces are exerted through the vacuum port 35e and vacuum manifold chamber 35b to assist the transfer of the part 11 to the particular mandrel portion on 35b.

With the parts 11 and 10 loaded to holders 35b and 38 in the manner described, the friction-welding operation takes place in the manner described in the aforementioned U.S. patent. As a given holder 35 continues to orbit on the carrier 22 its pulley 36 engages the continuously driven belt 37 and is rotated to a predetermined speed. At the time that pulley 36 leaves the belt 37, the holder 35 and the part 11 on mandrel 35b are rotating at a proper predetermined speed and the holder assembly 35 is moved upwardly to engage the part 11 within the part 10 and permit the friction welding operation to take place along the weld line "a" shown in FIG. 7 The speed of rotation of a lower mandrel assembly 35 is so predetermined relative to the weight of the parts that sufficient rotative energy is developed only so that, once a friction-weld has been completed, the lower holder assembly 35 will have stopped rotating, all available energy having been expended in creating the frictional heat involved in spinning the container part 11 relative to the rotatively stationary container part 10. The fit of the part 11 within the part 10 may be termed an "interference" fit of the type characterized in the aforementioned patent. Once mandrel 35 has stopped rotating, the manifold chamber 35b is discommunicated from its vacuum source and the bottom holder assembly 35 is moved downwardly out of the welded bottom part 11. Shortly thereafter, the upper holder assembly 20 has moved around to the discharge star-wheel assembly 19 and the vacuum in the particular diaphragm vacuum line 51 is discommunicated from its source so that spring 50 can return the band 40 to the disengaged position shown in FIG. 5 whereby the welded container parts are free to drop from the upper holder ring 39.

The timing of the application of suction forces to each diaphragm assembly 44 and to each lower mandrel 35b and the disapplication of such suction forces can be accomplished in any well-known manner. For instance, a valve assembly of the type shown in the present assignee's copending application, Ser. No. 729,056, entitled Mechanism For Removing Containers From Mandrels, may be used. Also limit switches may be used which are in the path of either of the upper or lower part holding assemblies 21 or 22, and which operate conventional valves communicating and discommunicating the vacuum hoses with conventional vacuum pumps. It is to be understood that the invention is not involved with the manner in which the vacuum is applied or removed since mechanism for accomplishing this is well known in the art and commercially available.

The invention is defined in the appended claims.

I claim:

1. In apparatus for friction-welding thermoplastic container parts and the like together: carrier means comprising an upper part holder and a lower part holder disposed in axial alignment and mounted for relative axial movement to bring parts held in them from a remote position axially into engaging relationship for friction-welding; means for relatively moving said holders in a rotary path to create sufficient friction between said engaged parts to friction-weld them together; means for supplying an upper part to one of said holders; means for supplying a lower part to the axially opposite holder; means operative before and after the parts are engaged for friction-welding for clamping and releasing parts to and from at least one of said holders; said holder for one of the parts comprising a holder having a socket for receiving a part; means within said socket movable from a radially expanded position freely receiving a part to a radially constricted position clamping the part in position; and means for operating said latter means to clamp and release the part.

2. The combination of claim 1 wherein said holders are mounted in vertical alignment in pairs on a continuously rotated carrier orbiting the holders about a vertical axis.

3. The combination defined in claim 1 wherein said radially movable means comprises a band having a tightenable loop and said operating means comprises a diaphragm connected with one end of the loop for drawing it tight around a part.

4. The combination defined in claim 3 wherein spring means normally biases said diaphragm in a direction to maintain said loop in radially expanded position.

5. The combination defined in claim 3 wherein said band is connected at one end to said holder and has an opposite end free from connection to said holder and connected with a diaphragm rod extending from said diaphragm.

6. The combination defined in claim 5 wherein means is provided for rotating the axially opposite holder in a direction of rotation such that if the same rotation were imparted to parts gripped by said band they would tend to cause the bands to more tightly grip the parts.

7. The combination defined in claim 2 wherein the parts received by the lower holders of each pair of holders have end wall portions; stationary vacuum duct means having a portion extending generally in the orbital path of said lower holders with vacuum ports in the lower face thereof generally in orbital alignment for supporting the end wall portions of said parts; means for transferring said parts, one behind the other, to said vacuum duct means; and means orbiting with each holder for engaging a part and moving it along said duct means into the orbital path of the holder and to a position of axial alignment therewith.

8. The combination defined in claim 2 wherein depressable support means for said upper parts are provided in the orbital path of said upper holders; and means is provided for transferring said upper parts to said depressable support means.

9. In apparatus for friction-welding thermoplastic container parts certain of which comprise cup-shaped parts with end wall portions, and the like, together: carrier means mounted for rotary movement; pairs of vertically aligned upper part and lower part holders on said carrier means disposed in axial alignment and mounted for relative axial movement to bring parts held in them from a remote position axially into engaging relationship for friction-welding; means for relatively moving said holders in a rotary path about their axes to create sufficient friction between said engaged parts to friction-weld them together; means for supplying said upper parts to certain of said holders; means for supplying said lower parts to axially opposite holders; the part received by the lower holder of each pair of holders being supplied in inversely disposed position; the means for supplying parts to said lower holders including orbitally stationary vacuum duct means having a portion extending generally in the orbital path of said lower holders with vacuum ports in the lower face thereof generally in orbital alignment for supporting the end wall portions of said parts; means for transferring said parts, one behind the other, to said vacuum duct means; and means orbiting with each lower holder for engaging a part and moving it along said duct means into the orbital path of the lower holder and to a position of axial alignment therewith.

10. The combination defined in claim 9 in which said latter means comprises a finger having a concave surface configured to receive a part and concentric with the lower holder, supported above each lower holder.

11. The combination defined in claim 9 in which star-wheel means delivers said parts to the duct means which is generally S-shaped and has its ports arranged generally in an S-pattern.

12. The combination defined in claim 11 in which one portion of said pattern is arranged along the orbital path of said star-wheel means and another is arranged along the orbital path of the lower holders for receiving the lower parts.

13. In apparatus for friction-welding thermoplastic container parts and the like together, where at least one of the parts has a wall portion to which suction holding force may be applied: carrier means mounting pairs of vertically aligned upper part and lower part holders in axial alignment for relative axial movement to bring parts held in them from a remote position axially into engaging relationship for friction-welding; means for relatively moving each pair of holders in a rotary path to create sufficient friction between said engaged parts to friction weld them together; means for moving the carrier means along a path of travel; means at a loading station adjacent said path of travel for supplying said upper parts to certain of said holders; means for also supplying said lower parts to axially opposite holders; the part, received by the lower holder of each pair of holders having the wall portion to which suction-holding force may be applied; the means for supplying parts to the lower holders including: stationary vacuum duct means having a portion extending generally in the path of said lower holders with vacuum ports in the lower portion thereof for supporting said wall portions of said parts; means for transferring said parts, one behind the other, to said vacuum duct means; and means moving with each lower holder for engaging a part and moving it along said duct means into the path of the lower holder and to a position of axial alignment therewith.

14. In apparatus for friction-welding thermoplastic container parts and the like together: carrier means mounted for movement in a path of travel; pairs of vertically aligned upper part and lower part holders on said carrier means disposed in axial alignment and mounted for relative axial movement to bring parts held in them from a remote position axially into engaging relationship for friction-welding; means for relatively moving said holders in a rotary path to create sufficient friction between said engaged parts to friction-weld them together; means for supplying said upper parts to certain of said holders; means for supplying said lower parts to axially opposite holders; stationary, generally vertically depressible support means for parts provided in the path of the upper holders to assist in moving the parts into the upper holders; and means for transferring parts to said depressible support means.

15. The combination defined in claim 14 in which said depressable support means comprises a pivotally supported roller platform; and spring means normally biases said platform to its raised position.

16. In apparatus for friction-welding thermoplastic container parts, some of which have axially extending ribs, and the like together: carrier means mounted for movement in a rotary path of travel; pairs of vertically aligned, orbiting upper part and lower part holders on said carrier means disposed in axial alignment and mounted for relative axial movement to bring parts held in them from a remote position axially into engaging relationship for friction-welding; means for relatively moving said holders in a rotary path to create sufficient friction between said engaged parts to friction-weld them together; means for supplying said upper parts to certain of said holders; certain of said holders comprising lower holders mounted for rotation relative to the upper holders and having axial grooves to receive the parts with ribs; drive means in the path of said lower holders for revolving them to perform the friction-welding operation; means for supplying said lower parts to axially opposite holders; and radially projecting abutment means disposed between said latter means and drive means in the orbital path of said lower holders to extend radially into their path at the time parts are released by said means for supplying parts to impart a rotary jog to the holders and cause the parts to be received by the lower holders with an interfitting rib and groove relationship.

17. The combination defined in claim 16 wherein said lower holders comprise mandrels over which container parts are received; said mandrels having suction chambers and ports leading from said chambers through said mandrels to vacuum clamp the parts to said mandrels.

18. In apparatus for friction-welding thermoplastic container parts and the like together: carrier means mounted for movement in generally rotary path; pairs of vertically aligned lower part holders on said carrier means disposed in axial alignment and mounted for relative axial movement to bring parts held in them from a remote position axially into engaging relationship for friction-welding; means for relatively moving said holders in a rotary path to create sufficient friction between said engaged parts to friction-weld them together; means for supplying upper parts to certain of said holders and lower parts to axially opposite holders; orbitally stationary support means at a loading station adjacent said path of movement having a portion extending generally into the orbital path of said holders between the orbital path of the upper and lower holders for supporting parts; means for transferring parts, one behind the other, to said support means; and positioning finger means orbiting with each holder which receives a part from said support means engaging a part on said support means and moving it along said duct means into the orbital path of the holder and to a position of axial alignment therewith.